(12) United States Patent
Naldurg et al.

(10) Patent No.: US 8,266,702 B2
(45) Date of Patent: Sep. 11, 2012

(54) ANALYZING ACCESS CONTROL CONFIGURATIONS

(75) Inventors: Prasad G. Naldurg, Bangalore (IN); Sriram K. Rajamani, Bangalore (IN); Stefan Schwoon, Kornwestheim (DE); John Lambert, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1298 days.

(21) Appl. No.: 11/555,218

(22) Filed: Oct. 31, 2006

(65) Prior Publication Data
US 2008/0104665 A1 May 1, 2008

(51) Int. Cl.
*G06F 7/04* (2006.01)
*G06F 11/00* (2006.01)
*G06F 21/00* (2006.01)

(52) U.S. Cl. .................. 726/25; 726/2; 726/17; 726/22; 726/23; 726/26; 713/182

(58) Field of Classification Search .............. 726/2, 28, 726/17, 22, 23, 25, 26; 713/182
See application file for complete search history.

(56) References Cited

U.S. PATENT DOCUMENTS

| | | | | |
|---|---|---|---|---|
| 7,171,562 B2* | 1/2007 | Brown et al. | .................. | 713/182 |
| 7,415,719 B2* | 8/2008 | Moghe et al. | ..................... | 726/1 |
| 7,614,077 B2* | 11/2009 | Brew et al. | ......................... | 726/1 |
| 7,900,240 B2* | 3/2011 | Terzis et al. | ........................ | 726/2 |
| 2005/0187937 A1* | 8/2005 | Kawabe et al. | ................... | 707/9 |
| 2006/0031206 A1* | 2/2006 | Deubel et al. | ..................... | 707/3 |
| 2006/0064528 A1* | 3/2006 | Soltis, et al. | .................. | 710/260 |
| 2006/0143704 A1* | 6/2006 | Rits et al. | ....................... | 726/17 |
| 2006/0236381 A1* | 10/2006 | Weeden | ............................ | 726/6 |
| 2006/0271596 A1* | 11/2006 | Sabsevitz et al. | ............. | 707/200 |
| 2007/0245032 A1* | 10/2007 | KishorVarshney et al. | ... | 709/229 |
| 2007/0277245 A1* | 11/2007 | Goto et al. | ....................... | 726/27 |
| 2010/0058072 A1* | 3/2010 | Teow et al. | .................... | 713/193 |

OTHER PUBLICATIONS

"F#," Microsoft Research, http://research.microsoft.com/fsharp/fsharp.aspx, [last accessed Aug. 22, 2006].
"Configuring the SELinux Policy," http://www.nsa.gov/SELinux/papers/policy2/t1.html, [last accessed Aug. 22, 2006].
"SETools—Policy Analysis Tools for SELinux," http://www.oss.tresys.com/projects/setools, [last accessed Mar. 22, 2007].
Bishop, Matt and Lawrence Snyder, "The Transfer of Information and Authority in a Protection System," SOSP 1979, © 1979 ACM, pp. 45-54.

(Continued)

*Primary Examiner* — Mohammad W Reza
(74) *Attorney, Agent, or Firm* — Perkins Coie LLP

(57) ABSTRACT

A facility is described for analyzing access control configurations. In various embodiments, the facility comprises an operating system having resources and identifications of principals, the principals having access control privileges relating to the resources, the access control privileges described by access control metadata; an access control scanner component that receives the access control metadata, determines relationships between the principals and the resources, and emits access control relations information; and an access control inference engine that receives the emitted access control relations information and an access control policy model, analyzes the received information and model, and emits a vulnerability report. In various embodiments, the facility generates an information flow based on access control relations, an access control mechanism model, and an access control policy model; determines, based on the generated information flow, whether privilege escalation is possible; and when privilege escalation is possible, indicates in a vulnerability report that the privilege escalation is possible.

17 Claims, 12 Drawing Sheets

OTHER PUBLICATIONS

Chen, Shuo et al., "A Black-Box Tracing Technique to Identify Causes of Least-Privilege Incompatibilities," NDSS 2005.

Govindavajhala, Sudhakar and Andrew W. Appel, "Windows Access Control Demystified," Jan. 31, 2006, Princeton University Technical Report, pp. 1-11.

Guttman, Joshua D. et al., "Verifying Information Flow Goals in Security-Enhanced Linux," Jan. 23, 2004, The MITRE Corporation, pp. 1-21.

Harrison, Michael A., Walter L. Ruzzo and Jeffrey D. Ullman, "Protection in Operating Systems," Operating Systems, Communications of the ACM, Aug. 1976, vol. 19, No. 8, © 1976, Association for Computing Machinery, Inc., pp. 461-471.

Herzog, Amy L. And Joshua D. Guttman, "Achieving Security Goals with Security-Enhanced Linux," Feb. 5, 2002, The MITRE Corporation, pp. 1-11.

Hinrichs, Susan and Prasad Naldurg, "Attack-based Domain Transition Analysis," 2nd Annual Security Enhanced Linux Symposium, 2006, pp. 1-5.

Jaeger, Trent, Xiaolan Zhang and Antony Edwards, "Policy Management Using Access Control Spaces," ACM Transactions on Information and System Security, vol. 6, No. 3, Aug. 2003, © 2003 ACM, pp. 327-364.

Lapadula, Len, "Secure Computer Systems: Mathematical Foundations," Nov. 1996, an electronic reconstruction of the original MITRE Technical Report 2547, vol. 1, by D. Elliott Bell and Leonard J. LaPadula, Mar. 1, 1973.

Lipton, R. J. and L. Snyder, "A Linear Time Algorithm for Deciding Subject Security," Journal of the Association for Computing Machinery, vol. 24, No. 3, Jul. 1977, © 1977 Association for Computing Machinery, Inc., pp. 455-464.

Loscocco, Peter A. et al., "The Inevitability of Failure: The Flawed Assumption of Security in Modern Computing Environments," NISSC 1998.

McLean, John, "A Comment on the 'Basic Security Theorem' of Bell and LaPadula," Information Processing Letters, 20, 1985, pp. 67-70.

McLean, John, "The Specification and Modeling of Computer Security," Computer 23, 1, 1990, pp. 1-16.

Sandhu, Ravi S., "Lattice-Based Access Control Models," Computer, Nov. 1993, © 1993 IEEE, pp. 9-19.

\* cited by examiner

ANALYZING ACCESS CONTROL CONFIGURATIONS

BACKGROUND

Operating systems (OSs) make access control decisions using configuration metadata, such as access tokens, security descriptors, capability lists, and access control lists (ACLs). The metadata is stored in different formats and can be manipulated in a variety of ways, directly influencing what is perceived as access control behavior. Existing interfaces to query and manipulate the metadata are generally low-level and do not allow software developers to specify information-flow goals and verify their intent effectively. As an example, in feature-rich operating systems such as MICROSOFT WINDOWS XP or Security Enhanced Linux (SELinux), there can be a complex interplay between different access control security mechanisms. As an example, access checks the OS performs based on a user's access token and a resource's security descriptor can be quite involved. An access token may contain group membership information that is inherited from a parent object. The token could have attributes that may not readily indicate a user's access privileges because these access privileges are inherited. Security descriptors identify security-related properties, such as access control permissions.

Users generally cannot directly specify simple information-flow policies, such as confidentiality, integrity, and privilege-escalation. As an example, a system administrator may desire to ensure various access control properties, such as integrity or confidentiality. When an OS offers integrity, a lower-privileged process cannot modify data used by a higher-privileged process. When an OS offers confidentiality, security-sensitive information is not accessible to lower-privileged processes. To enforce these conceptually simple access controls, users may need to correctly configure a variety of low-level access settings. This configuration can be complex and, if not correctly implemented, may not be correctly enforced.

Moreover, some security-related dependencies may not be directly visible. As an example, some OSs may implicitly decide whether a user is a member of an "Interactive Users" group when the user logs in. Consequently, the user's access control permissions may not be discernible until the user logs in.

In some OSs, the protection model is rigid and restricted to fully privileged kernel mode and a lesser-privileged user mode. Because this type of protection model cannot be easily changed, many applications run with far more privileges than a task may need.

As a result of these difficulties, system developers may inadvertently create access vulnerabilities, such as by configuring overly permissive ACLs and assigning higher privileges than a task may need. Moreover, when a new application is installed or configured, it can be difficult to analyze the impact of its permission and privilege settings and select a configuration that best minimizes the risk of an information-flow vulnerability.

SUMMARY

A facility is described for systematically analyzing and detecting explicit information-flow vulnerabilities in access control configurations. The facility separates access control mechanisms and access control policies for analysis. A tool associated with the facility takes a snapshot of access control metadata associated with an operating system, and can perform an analysis on this snapshot. The facility can employ an augmented relational calculus that naturally models both access control mechanisms and information-flow policies uniformly. The facility interprets this calculus as a logic program with fixpoint semantics that are similar to the Datalog language and produces access "tuples" that violate access control policies. The facility is programmable both at the model level and at the property level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
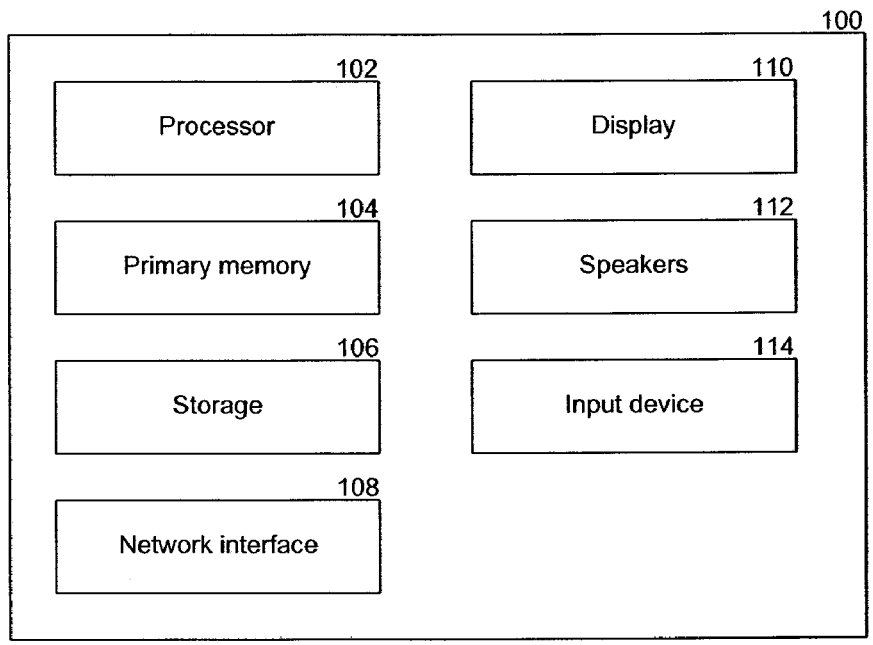
FIG. 1A is a block diagram illustrating an example of a suitable computing environment in which the facility may operate in some embodiments.

A facility is described for providing an analysis framework for organizing access control metadata and automatically detecting information-flow vulnerabilities. In various embodiments, the facility separates access control mechanisms and access control policies for analysis. In various embodiments, the framework has two layers that separate security policies from the mechanisms by which they may be implemented: a mechanism layer and policy layer. The mechanism layer has a list of OS-specific access control derivation rules that take as inputs metadata relating to the OS's access control settings, and provide an output of simplified sets of inferred permissions available to principals (e.g., users, groups, etc.) in relation to resources (e.g., files, folders, memory, network ports, etc.), thereby masking details of an access control model that the OS implements or enforces. Thus, the mechanism layer can derive relations between principals and resources. The policy layer employs queries that are interpreted over these derived relations and correspond to information-flow properties. When the facility detects a property violation, it can provide one or more derivation trees. The derivation trees indicate relations between principals and resources, whether explicit or derived, that lead to the vulnerability. The facility can provide the derivation trees in vulnerability reports.

Because policies are generally defined by business entities, the policy layer is not OS-specific. However, access control mechanisms are generally OS-specific. In some embodiments, the facility can accommodate different underlying access control models at the mechanism layer, such as OS-specific access control models. The mechanism layer can be substituted to adapt the facility for use with various operating systems. This decoupling between the behavioral model of the underlying access control system and the security policies provides a methodology for closing the gap between OS-specific mechanisms and generalized policies.

Using this framework, the facility was able to identify security vulnerabilities in several commercially used operating systems. As examples, the facility located a number of resources whose contents were used by administrative processes and other processes that were supposedly restricted to the least privileges necessary to fulfill their tasks, but were in fact running with larger privileges, thus defeating the purpose of confinement. The facility can output derivation trees ("proof trees") for the vulnerabilities it finds. The separation of policy from mechanism also enables the facility to emit vulnerability reports hierarchically, starting with a policy violation at a level of a derivation tree, adding more implementation details at each subsequent level of the derivation tree, and eventually leading to the corresponding violations in the mechanisms. This separation enables the facility to provide readable and understandable vulnerability reports.

The facility can perform a static analysis on a dynamically generated snapshot of access control metadata. The facility can receive access control policies and mechanisms in an augmented relational calculus with Datalog-like rules. The tool can employ an inference engine to compute least fixpoints and store all derivation trees corresponding to violations of the defined access control properties. If f is a function that takes values from a domain D, a value v in D is a fixpoint of f if and only if f(v)=v.

Access control can be defined as a relational model over the following domains: the set of subjects S (or principals, such as users, groups, etc.), the set of objects O (or resources, such as files, handles, memory, network ports, etc.) and the set of rights R (or permissions). Access control is a characteristic function on the set $A \subseteq S \times O \times R$. A principal s is granted permission r over resource o if and only if $\langle s,o,r \rangle \in A$.

In OSs, the access control model is typically implemented with a reference monitor using a data structure called an access matrix. For efficiency and other reasons, the access matrix is stored either (1) as an ACL that is associated with a resource and is the list of all principals and their associated permissions on the given resource, or (2) as a capability list, which is a list of resources and associated permissions a given principal is capable of accessing.

Access control models can impose further restrictions or constraints on the derivation of the characteristic function, or the set of allowed access tuples. For example, classical access control models include the concept of ownership. The two most popular models of ownership, the Discretionary Access Control (DAC) and the Mandatory Access Control (MAC), differ in terms of who is allowed to change permissions associated with a resource. In the DAC model, it is at the discretion of the owner of the resource. In the MAC model, a system-wide policy applies to all principals and resources, and cannot be changed by users. Most systems today are a combination of MAC and DAC. This combination has resources that can be owned by individual users, but the system can override any user permissions.

Though the mechanisms used to implement the characteristic function can vary for different access control models, the function can be derived from a higher-level information-flow policy specification. Information-flow policies that govern the flow of information in a system are independent of the mechanisms used to implement the access function. As mentioned above, typical information-flow properties in this context are confidentiality and integrity and can be expressed in terms of desirable read-write and write-read traces. The facility can also model some privilege escalation vulnerabilities as information-flow properties.

A privilege escalation attack that exploits a buffer-overflow vulnerability takes advantage of an underlying coarse-grained protection model that grants access to protected system functions. A more direct vulnerability occurs when a resource can be written by an administrator and subsequently executed by a lower-privileged user. An attacker can take advantage of this vulnerability to introduce malicious code that can be executed by the administrator and as a consequence successfully mount a privilege escalation attack.

In various embodiments, the facility can analyze access control systems and detect information-flow vulnerabilities by statically analyzing a snapshot of the access control metadata. The facility exaggerates the separation between policy and mechanisms in access control systems. Adapting the facility for use with a specific OS can be done by employing a scanner that parses a dynamic snapshot of the low-level access control metadata and converts it into relational form. The facility employs a description of the access control mechanisms as a declarative set of rules. The facility's inference engine can then look for information-flow vulnerabilities.

The metadata, policy, and mechanism specifications form a deductive database system. Inputs to the inference engine, including the access control relations, mechanism specification, and policy specification, can be provided in the form of declarative rules. These rules are similar to rules in Datalog, with custom augmentations that do not impact the decidability of query-satisfaction for their fixpoint semantics. Each rule can have the following form:

$$L(X_1, X_2, \ldots) :- R_1(X_{i_1}, X_{i_2}, \ldots), R(\ldots), \ldots,$$

$$\sim F_1(X_{j_1}, X_{j_2}, \ldots), \sim F_2(\ldots), \ldots,$$

$$X_k = f(V_{k_1}, V_{k_2}), \ldots$$

$$(V_{n_1} \circ V_{n_2}), \ldots$$

The right-hand side of each rule contains four kinds of predicates: (1) positive predicates $R_1, R_2, \ldots$,; (2) negated predicates $F_1, F_2, \ldots$,; (3) functions $X_k = f(V_{k_1}, V_{k_2})$, where $V_{k_1}$ and $V_{k_2}$ are either variables or constants, and the function $f$ is an arithmetic operator such as + or −; and (4) relational predicates such as $(V_{n_1} \circ V_{n_2})$, where $V_{n_1}$ and $V_{n_2}$ are either variables or constants, and $\circ$ is a relational operator such as $\geq$ or $\leq$. Rules can be recursive. The predicate L on the left-hand side can also occur on the right-hand side.

To ensure that the fixpoint semantics of the rules are well defined, the facility can impose the following two restrictions. First, occurrences of negations should be "stratified." That is, a dependency graph can be built with a node for every predicate, and an edge can be added from every predicate on the right-hand side of each rule to the predicate on the left-hand side. An edge is marked as negated if the right-hand side predicate is negated. Negated edges cannot occur within a strongly connected component in the dependency graph. The inference engine first partitions predicates into strongly connected components and processes the strongly connected components in reverse topological order. A component can be strongly connected when it has multiple dependencies. Within each strongly connected component, the inference engine runs the rules and generates new "facts" until a fixpoint is reached. Since negations occur between strongly connected components, the fixpoint computation is well defined.

Second, every variable used in a negated predicate, in the right-hand side of a function, or in a relational predicate, also needs to be used in a positive predicate in the left-hand side of a function in the same rule. Due to this restriction, each rule can be evaluated by first performing a "join" operation on the positive right-hand side predicates, applying the functions, and finally applying the negative predicates and filters on the rows of the resulting tables.

The inference engine can use a standard bottom-up fixpoint algorithm to evaluate queries. In an embodiment, the inference engine is custom-built and can be written in about 1800 lines of the F# language. Every proof found by the facility as a counter-example to a safety property corresponds to a different security vulnerability. Thus, the inference engine maintains all possible proofs for every fact it derives. The proofs can be maintained along with the inferences. When a vulnerability is discovered, the facility can display every proof as a directed acyclic graph ("DAG"), which represents the vulnerability in a graphical form. Due to the separation of rules into policy and mechanism, the graphs can be read hierarchically, corresponding to different levels of abstraction.

Mechanism Specification

Input to the model is the OS-specific access control metadata, and output is a set of Read, Write, and Execute relations indicating which principals in the systems can access which resources, consistent with their respective model specifications.

MICROSOFT WINDOWS XP Access Control

MICROSOFT WINDOWS XP implements the discretionary access control (DAC) model, where only the owner of a resource is authorized to change its access permissions. Operationally, whenever a thread of execution within a process attempts to access a resource (such as a file, directory, thread, kernel object, pipe, socket, etc.), the OS invokes a component of the kernel called the Security Reference Monitor (SRM). The SRM uses an access-check algorithm to determine whether the entity can access the resource.

Each process in WINDOWS XP has a token that describes its security context. The token is assigned to a user during logon, and its contents depend on the access rights of the user. The token contains information about the owner of the process and its groups. Owners and groups are represented by security identifiers (SIDs). An SID may be enabled or disabled for a particular context. In addition, the SID can be marked "deny only" or "restricted," which is explained later. A token also contains a list of privileges. Threads typically do not have tokens. However, during impersonation, a thread inherits the token of the process that it is impersonating. Token attributes, such as impersonation privileges and restricted SIDs, determine permissions that are granted to a thread.

Each resource in WINDOWS XP has a Security Descriptor (SD) object associated with it. An SD contains, among other things, information about the owner of the object and an entry for the discretionary access control list (DACL). This DACL can be "null" (i.e., not present) or it can be an ordered list of Access Control Entries (ACEs). ACEs come in two types: (1) an "allow ACE" describes which entities are allowed access to the resource and (2) a "deny ACE" describes which entities are denied access to the resource.

Whenever a thread tries to get a handle to a resource, the SRM invokes a function called AccessCheck to determine whether the access can be granted. The AccessCheck function takes three inputs: (1) the SD for the object, (2) the token for the requesting entity or principal, and (3) the type of access requested (read, write, execute, etc.).

If the DACL for that resource is missing (e.g., "null"), all accesses to the resource are allowed. If a list of ACEs is present, it will be evaluated to determine the permission. The order of the ACEs can matter. As an example, the first ACE that matches the request determines the decision. Thus, a deny ACE preceding an allow ACE would mean that the access is denied instead of being allowed, and vice versa. Tokens can have restricted SIDs, and if such restricted SIDs are present, then the AccessCheck runs the algorithm again with new information, as described below.

1. A check is made if the DACL in the SD object is NULL. If so, there are no conditions for access, and the access is allowed.
2. The ACEs in the SD object are examined in increasing order of indices, and the following checks are performed for each index i:
   (a) If the ACE at index i is a deny ACE, and the ACE matches an SID in the token presented and the type of access requested, then the access is denied and AccessCheck terminates.
   (b) If the ACE at index i is an allow ACE, and the ACE matches an SID in the token and the type of access requested, then the algorithm proceeds to step 3.
3. If the token does not contain any restricted SIDs, then access is allowed and AccessCheck terminates. Otherwise, a second pass is made through the ACL and a similar check as at step 2 is made that operates only on the restricted SIDs.

A simplified version of the mechanism layer for Windows XP access control is given in Table 1. The underlying metadata are obtained by a snapshot of running processes in the system.

Given an SID "sid" and a resource "rsrc," the first rule in Table 1 indicates that Read(sid,rsrc) holds whenever there is a thread owned by the SID sid with a token, such that Access-Check(token,rsrc,'r') holds. Process ID can identify tokens with which they are associated. The relation ProcessTokenUser relates tokens and the SIDs of their owners. The variable rsrc can be thought of as a unique reference to a resource.

The rules for AccessCheck declaratively describe the functionality of WINDOWS XP's AccessCheck function. The first AccessCheck rule in Table 1 indicates that in the case of a "null" DACL on the resource, any access is allowed. The predicates FirstPass and SecondPass model the two passes of the algorithm. The rule for the predicate FirstPass indicates that FirstPass(token,rsrc,t) holds whenever there is an allow ACE at index i and no deny ACE up to index i for some index i. The rule for the predicate DenyAce is recursive, and states that if DenyAce holds at some index i, then it holds at larger indices as well (up to num, which is the total number of ACEs for the resource). Thus, the rules faithfully model the order-dependent processing of ACEs. The relation ACE is obtained by parsing the SD metadata, and contains each ACE present in the SD, ordered by the indices. The relations HasEnabledSID and HasDenyOnlySID model the SIDs associated with a token and are obtained from the token metadata.

The second pass is modeled using the predicate Second-Pass. The first rule for SecondPass indicates that if there are no restricted ACEs, then the second pass is equivalent to the first pass. The remaining rules for SecondPass are analogous to the rules for FirstPass with the difference being that restricted SIDs are used.

TABLE 1

WINDOWS XP Access Control Algorithm

Read(sid,rsrc) :- ProcessTokenUser(token,sid),
    AccessCheck(token,rsrc,"r").
Write(sid,rsrc) :- ProcessTokenUser(token,sid),
    AccessCheck(token,rsrc,"w").
Execute(sid,rsrc) :- ProcessTokenUser(token,sid),
    AccessCheck(token,rsrc,"e").
AccessCheck(token,rsrc,t) :- Token(token), NullDacl(rsrc), AccessType(t).
AccessCheck(token,rsrc,t) :- FirstPass(token,rsrc,t),
    SecondPass(token,rsrc,t).
FirstPass(token,rsrc,t) :- AllowAce(token,rsrc,t,i),
    ~DenyAce(token,rsrc,t,i).
AllowAce(token,rsrc,t,i) :- Ace(rsrc,i,"allow",sid,t),
    HasEnabledSID(token,sid).
DenyAce(token,rsrc,t,i) :- Ace(rsrc,i,"deny",sid,t),
    HasEnabledSID(token,sid).
DenyAce(token,rsrc,t,i) :- Ace(rsrc,i,"deny",sid,t),
    HasDenyonlySID(token,sid).
DenyAce(token,rsrc,t,i) :- DenyAce(token,rsrc,t,d),
    NumAces(rsrc,num), i := d+1, i < num.
SecondPass(token,rsrc,t) :- NoRestrSIDs(token),
    FirstPass(token,rsrc,t).
SecondPass(token,rsrc,t) :- RestrAllowAce(token,rsrc,t,i),
    ~RestrDenyAce(token,rsrc,t,i).
RestrAllowAce(token,rsrc,t,i) :- Ace(rsrc,i,"allow",sid,t),
    HasRestrSID(token,sid).
RestrDenyAce(token,rsrc,t,i) :- Ace(rsrc,i,"deny",sid,t),
    HasRestrSID(token,sid).
RestrDenyAce(token,rsrc,t,i) :- RestrDenyAce(token,rsrc,t,d),
    NumAces(rsrc,num), i := d+1, i < num.

SELinux Access Control

SELinux is an enhancement to the LINUX kernel that introduces mandatory access control (MAC) to standard LINUX. It is shipped with a number of LINUX distributions, such as Debian and Fedora. In Fedora Core 5, the Targeted configuration of SELinux is enabled by default. SELinux attempts to confine each system server and user process to the minimum amount of privileges and rights required for their functioning. Thus, when one of these entities is compromised (e.g., through buffer overflows), its ability to cause damage to the system is reduced or eliminated.

The security architecture of SELinux supports many underlying policy abstractions. These include Type Enforcement (TE), Role-Based Access Control (RBAC), and Multi-Level Security (MLS), which is a type of MAC. The specific policy enforced by a particular installation is governed by a configuration file. The configuration is specified in a declarative language called "SELinux policy." While one would hope that this policy language would provide higher-level abstractions, it is well known that it suffers from a granularity problem and is considered too low-level to express information-flow goals effectively.

SELinux enforcement is built on top of the standard Unix DAC model. To allow access, a request has to be first allowed by this underlying model, except when an override option is set. The SELinux mechanisms are used typically to restrict these permissions and refine accessibility in terms of least privilege. The TE component defines an extensible set of domains and types. Each process in an SELinux installation has an associated domain and each object has an associated type. Objects types may be further aggregated as classes. The configuration files specify how domains can access types (as a set of access vector rules) and interact with other domains. In addition, they specify transition rules that govern what types can be used to enter domains, as well as allowable transitions between domains, typically by executing programs of certain types (and classes). This ensures that certain programs can be placed in restricted domains automatically, depending on what they execute.

In addition to TE, SELinux provides support for RBAC in terms of an extensible set of roles. Each user in the system can be associated with multiple roles. The configuration specifies which users can enter what roles as well as the set of domains that may be entered by each role. MLS is the standard Bell-LaPadula lattice-based MAC model.

SELinux Targeted Configuration

The Targeted configuration of SELinux that we analyze is intended to lock down specific daemons or processes, based on their vulnerability. These daemons run under the super-user account root that usually has full control over the system, but SELinux adds mechanisms designed to restrict them to the least privileges needed to fulfill their tasks. The rest of the system runs with original Linux default permissions. Untargeted processes run in the unconfined_t domain. The targeted processes switch to their protected domains when they are executed in the system. For example, the "initd" process runs as unconfined unless it executes a program belonging to any of the targeted domains.

The Targeted configuration is a combination of RBAC and TE. Its configuration files contain rules that form a declarative mechanism specification. The rules define types, domains, roles, associations between roles and domains, access vectors, and domain-type transitions. These rules form the access control metadata that is analyzed by the tool.

From this metadata, the facility can extract the following relations:

AllowRead, NeverAllowRead, and the analogous write and execute relations: these specify the read, write, and execute permissions that domains have over types (or classes), where the NeverAllow . . . predicates are used to deny permissions that would otherwise be granted by Unix DAC settings.

ResourceType and TypeClass: these provide the membership relations of resources in types and of types in classes.

TypeTransition: a fact of the form TypeTransition (d1,t,d2) indicates that if a process of domain d1 creates a new process by executing an object of type t, then the new process will run under the domain d2. Note that no new domains or types are created by this rule.

The goal of the analysis is to determine whether the targeted daemons in the given configuration run with unnecessary privileges that could lead to vulnerabilities when a daemon is compromised. Since the daemons are running as root, they are unrestricted by the Unix DAC model, which we therefore ignore.

The resulting access control model is specified in Table 2. The Read predicate specified on the first line proceeds as follows: (1) type of the resource is found; (2) determine whether an AllowRead association can be found for the domain-type pair, either directly or by virtue of the type being a member of a class for which this is allowed, as specified near the end of Table 2; and (3) determine whether a never-allow association exists for the same domain-type pair. Access is denied if such an association is found, or if no allow relationship is found.

The rule for Write is similar to Read. For the Execute predicate, in addition to checking membership in allow and never-allow relations, the facility also checks whether there is a type-transition rule triggering a transition to another domain where the file will be executed. If there is a transition to another domain, the file will actually execute under the new domain.

TABLE 2

SELinux Access Control Algorithm

Read(domain,resource):- ResourceType(resource,type),
    DomReadType(domain,type), ~NeverAllowRead(domain,type).
Write(domain,resource):- ResourceType(resource,type),
    DomWriteType(domain,type), ~NeverAllowWrite(domain,type).
Execute(domain,resource):- ResourceType(resource,type),
    DomExecType(domain,type),~AnyTTR(domain,type),
    ~NeverAllowExecute(domain,type).
Execute(domainp,resource):- ResourceType(resource,type),
    ~NeverAllowExecute(domain,type),
    TypeTransition(domain,type,domainp).
AnyTTR(domain,type) :- TypeTransition(domain,type,domain2).
DomReadType(domain,type) :- AllowRead(domain,type).
DomReadType(domain,type) :- AllowRead(domain,class),
    TypeClass(type,class).
DomWriteType(domain,type) :- AllowWrite(domain,type).
DomWriteType(domain,type) :- AllowWrite(domain,class),
    TypeClass(type,class).
DomExecType(domain,type) :- AllowExecute(domain,type).
DomExecType(domain,type) :- AllowExecute(domain,class),
    TypeClass(type,class).

Vulnerability Specifications

A similar specification language can be used to express information-flow properties of interest with respect to explicit flows. This vulnerability analysis is independent of the underlying implementation mechanisms. This specification of vulnerabilities can be evaluated against different access control models, as long as the metadata can be meaningfully expressed as the simplified read, write and execute relations.

Information-Flow Properties

Flow of information occurs from a resource to a user when the user either reads or executes the resource, and from a user to a resource when the user writes to the resource. While many of these flows are by design, certain types of flows are undesirable. To identify access control problems, we are generally interested in flows that go across what are called protection boundaries. Information-flow analysis of this nature is most useful when we start with susceptible programs or have access to very sensitive data. Ideally, it should be impossible for susceptible programs that are run with lower privileges to access the same data available to the sensitive programs that run with higher privileges, except perhaps in very constrained circumstances. The queries therefore are about flows between lower-privileged users through the set of susceptible programs to the set of sensitive programs that can be accessed by users with higher privileges.

TABLE 3

Specifications of Vulnerabilities

WriteExecuteAttack(s1,s2,rsrc):- Write(s1,rsrc), ~Admin(s1),
    Execute(s2,rsrc), Admin(s2).
IntegrityAttack(s1,s2,rsrc):- Write(s1,rsrc), ~Admin(s1), Read(s2,rsrc),
    Admin(s2).
ConfidentialityAttack(s1,s2,rsrc):-Read(s1,rsrc), ~Admin(s1),
    Write(s2,rsrc), Admin(s2).
Tainted(s1,s2):- Write(s1,rsrc), ~Admin(s1), Read(s2,rsrc), ~Admin(s2).
Tainted(s1,s2):- Write(s1,rsrc), ~Admin(s1), Execute(s2,rsrc),
    ~Admin(s2).
Tainted(s1,s3):- Tainted(s1,s2), Tainted(s2,s3).
TransitiveAttack(s1,s3):- ~Admin(s1), Admin(s3), Tainted(s1,s2),
    WriteExecuteAttack(s2,s3,rsrc).
TransitiveAttack(s1,s3):- ~Admin(s1), Admin(s3), Tainted(s1,s2),
    IntegrityAttack(s2,s3,rsrc).

Vulnerability Specification

Table 3 specifies information flows that are undesirable. The variables in the relations can be interpreted in the context of specific models. For example, subjects are SIDs in WINDOWS XP and domains in SELinux. The facility can encode implementation-specific details as filters in the mechanism-specification without changing queries, and nevertheless improve the relevance of results.

1. Privilege Escalation (W-E Vulnerabilities): The first rule in the specification illustrated in Table 3 is the write-execute (W-E) privilege escalation vulnerability. In its simplest form, a W-E vulnerability can be defined as one in which a resource has a write permission by a non-administrative user and an execute permission by an administrator. Potentially, the non-administrative user can make the administrator execute dangerous code (e.g., by writing malicious code into the resource) that gives the non-administrative user elevated privileges to the system. The rule states that a W-E vulnerability exists between two subjects s1 and s2 if one of them, say s1, has write permissions on the resource, and is not an administrative or high-privileged user, and if the other user, s2, has execute privileges on the same resource.

2. Integrity and Confidentiality Concerns: we can specify an integrity vulnerability as a write-read flow between a non-administrative user and an administrator, and an undesirable confidentiality flow as a read-write flow in this context.

3. Taint Analysis: The next specification is for taint analysis. The first and second rules state that a non-administrative subject s1 can taint another non-administrative subject s2 if there is a possibility of a write-read or write-execute flow between them. Furthermore, this relation is transitive if there is a third subject that is the destination of one flow and the originator of another. Taint analysis is useful to explore the potential spread of compromised information (e.g., virus) in a system.

4. Transitive Vulnerabilities: Taint analysis forms the basis for the specification of a transitive vulnerability. A possibility of a transitive vulnerability between a non-administrative subject s1 and an administrator s3 exists if s1 can taint s2 and there is a W-E vulnerability or a W-R vulnerability between s2 and s3, as specified.

Results

Results were obtained by employing the facility on both WINDOWS XP and SELinux. The vulnerability reports indicate possible attacks. The specifications can be refined by adding appropriate filters to improve the relevance of vulnerabilities the facility finds.

Results on WINDOWS XP

When employed with specifications in Table 1, together with the vulnerability specifications from Table 3, the tool produced 4853 vulnerabilities over 1326 unique resources. Several of these vulnerabilities are benign, and running the tool for the model at this level of abstraction produced a large amount of "white noise." A typical vulnerability report was of the form "User u has privileges to write into a resource r, and an administrator a has execute permissions on r." However, even if the administrator can execute r, it might never actually do so. To make the results of the tool more relevant, the Execute rule in Table 1 can be refined to also add that for an administrator to be considered to have a chance of executing a resource rsrc, the administrator should also have an open handle for rsrc. Thus implementation details that improve the usability of the facility can be pushed to the model level, retaining the power of abstraction at the property specification level.

After this additional filtering, the tool produced 176 vulnerability reports on 58 different resources. Every report was a plausible vulnerability. Examples of two of these vulnerability reports are illustrated in FIGS. 5A and 5B.

Figure 5A:
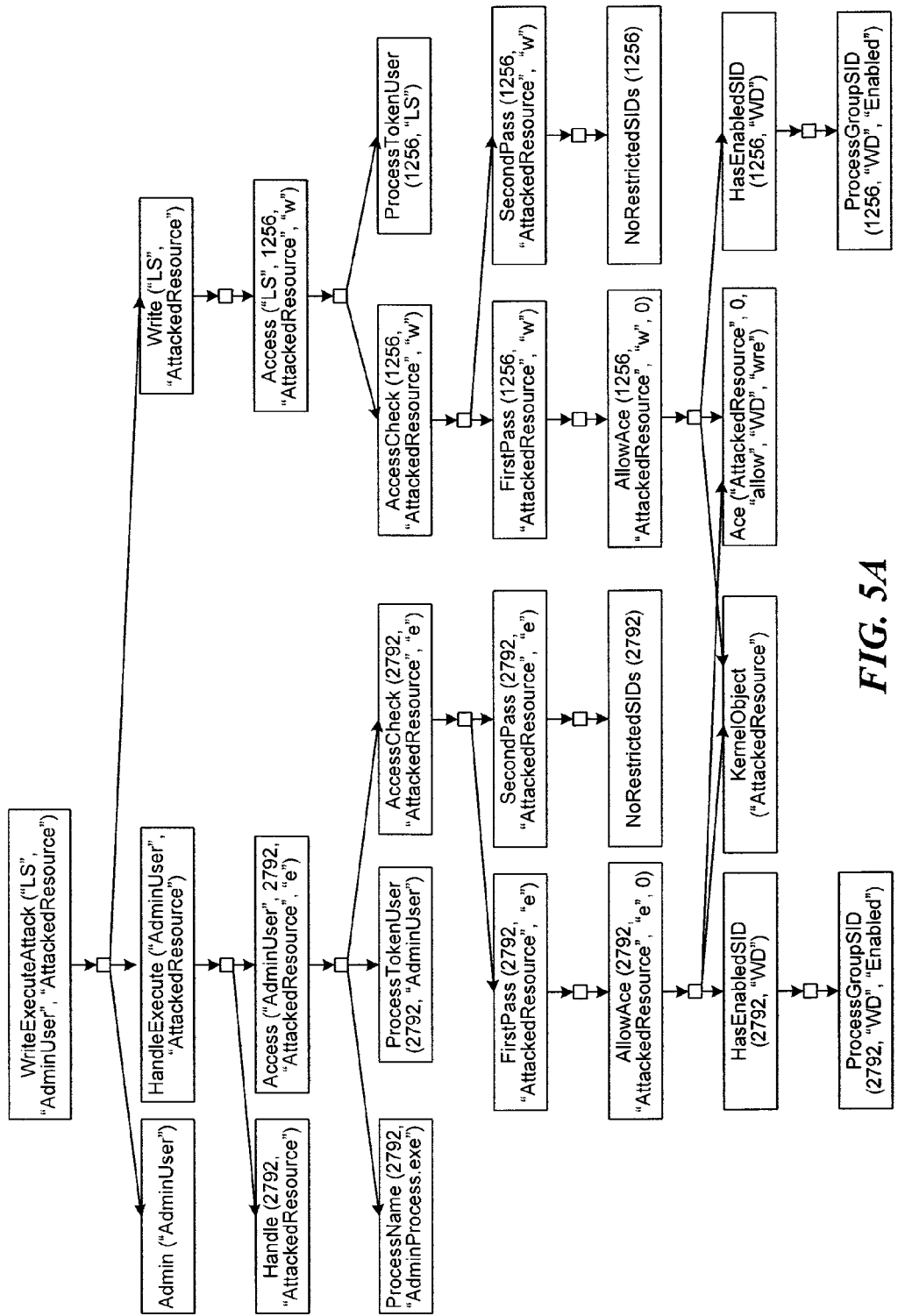
FIGS. 5A, 5B, and 6 are samples of vulnerabilities reports illustrated in graphical form.

According to the vulnerability report in FIG. 5A: (1) the Administrative user has administrative privileges, (2) the Administrative user has both a handle and execute permissions on AttackedResource, and (3) LS (or Local Service, which is a group with low privileges) is running a process with write permissions to AttackedResource. Now, if we ask the question, "How does that process have write permissions to AttackedResource?", we can descend down the node labeled Write("LS", "AttackedResource") and learn that this is due to a process that is owned by LS and has the appropriate token. If we ask the question, "How does this process have access to AttackedResource?", we can descend down the tree farther, and locate the actual ACE on the security descriptor for AttackedResource due to which Windows XP's Access-Check granted this access. The ACE in question makes the resource "worldwriteable" (denoted by WD in the illustrated graph), which allows any user, not just LS, to write to the resource.

Figure 5B:
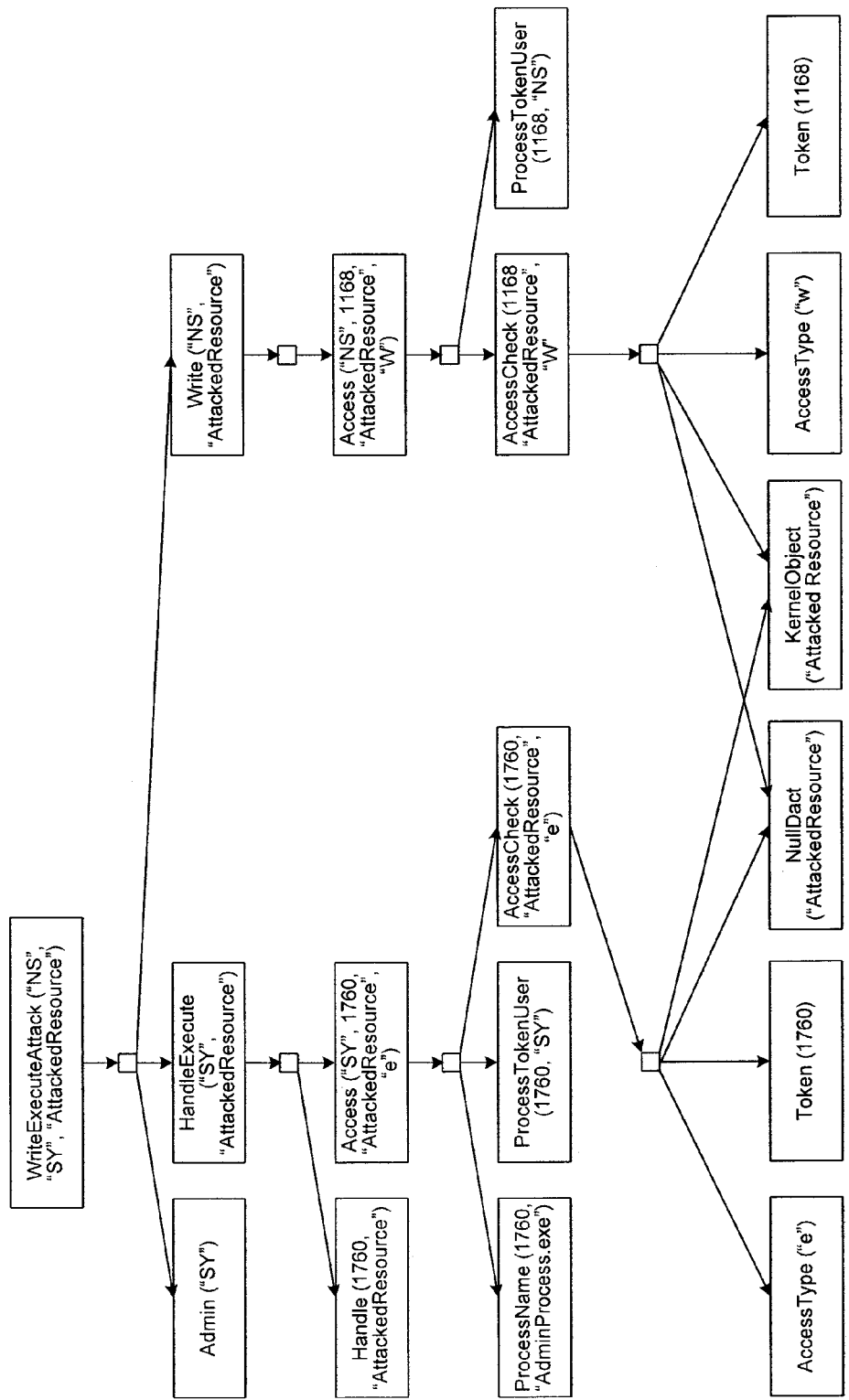

The vulnerability report illustrated in FIGS. 5A and 5B also shows a write-execute vulnerability, but here the user gets access to the AttackedResource due to a "null" DACL.

Results on SELinux

To discover whether the targeted daemons run with overly permissive rights, we can check whether they can compromise files used by an unrestricted root process. Since such processes are not directly represented in the SELinux configuration, applicants added an artificial, all-powerful 'root' domain to the configuration, which, for the purposes of the vulnerability specification, was considered to be an administrator.

Usability of the tool can be improved by adding a filter at the model level. The filter can specify that only vulnerability reports on certain files would be considered interesting. Applicants searched for attacks on the su binary that is used for logging in as a super user. In general, a broader scope for the search would be desirable. As an example, one could look for attacks on all system executables whose 'setuid' attribute is set.

Figure 6:
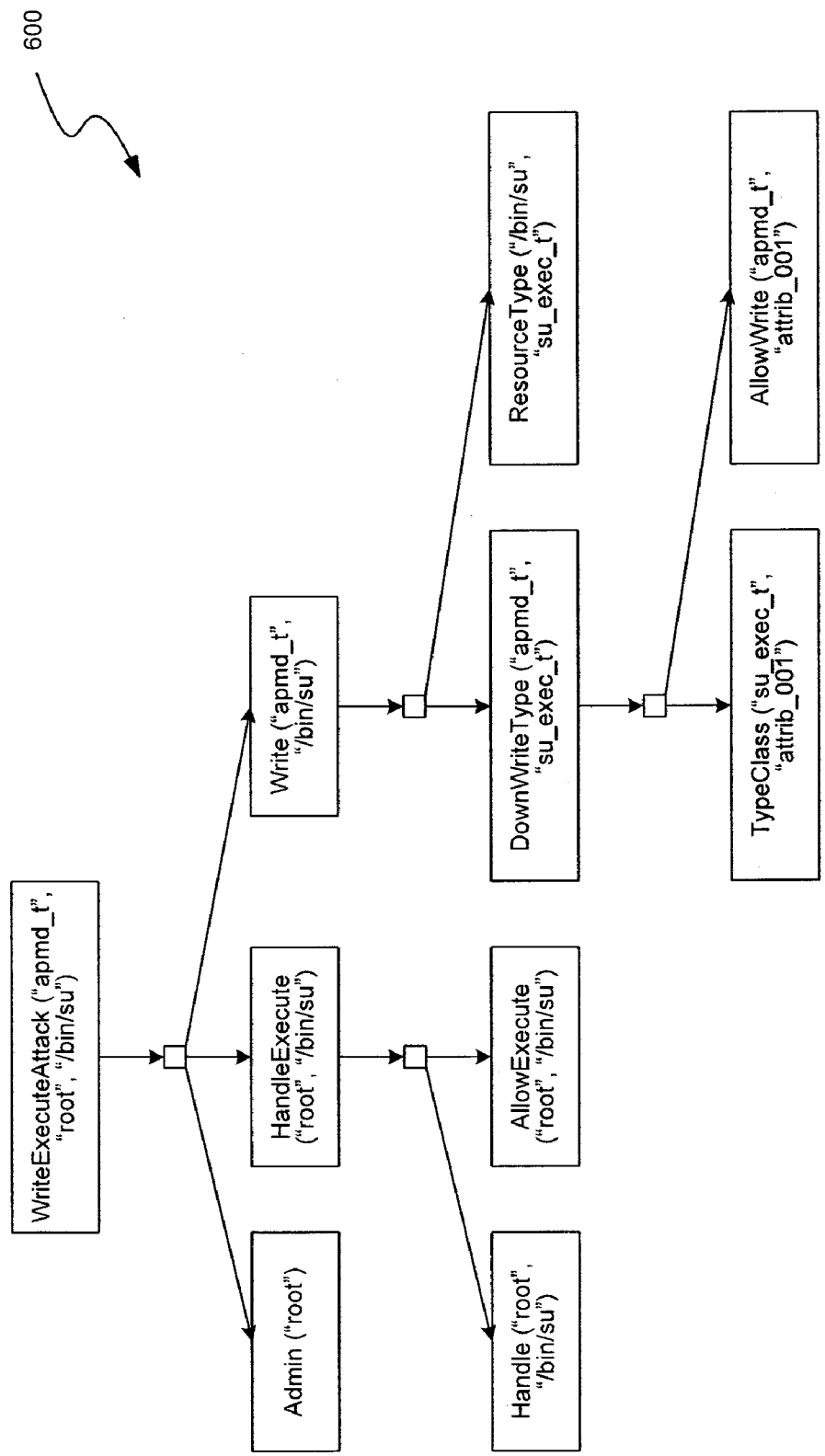

With this configuration, the facility reported 26 different domains in the SELinux configuration that had write access to the su binary. A sample vulnerability report is illustrated in FIG. 6. In this example, a process of type apmd_t can write to a binary of type su_exec_t (which includes su) by virtue of having write access to the class attrib_001, of which su_exec_t is a member. An example of a process running as apmd_t is the acpid daemon, whose purpose is the management of Advanced Configuration and Power Interface (ACPI) events.

The permission to rewrite security-critical binaries is not required for the operation of this daemon. If a daemon running under any of the above domains is compromised (e.g., by a buffer overrun), an attacker could trick the daemon into rewriting the su binary to remove the password check, thus giving the attacker full access to the system, a kind of vulnerability that SELinux was actually designed to prevent.

The goal of any access control model is twofold: (1) to allow principals to share resources and communicate with each other legitimately for their functionality requirements and (2) to disallow bad information flows that compromise integrity and confidentiality.

The facility is now described in more detail in reference to the Figures. FIG. 1A is a block diagram illustrating an example of a suitable computing environment 100 in which the facility may be implemented. A system for implementing the facility includes a general purpose computing device in the form of the computing system ("computer") 100. Components of the computer 100 may include, but are not limited to, a processing unit 102, a system primary memory 104, a storage unit 106, a network interface or adapter 108, a display 110, one or more speakers 112, and an input device 114.

The computer 100 typically includes a variety of computer-readable media that are operable with the storage unit 106. Computer-readable media can be any available media that can be accessed by the computer 100 and include both volatile and nonvolatile media and removable and nonremovable media. Computer-readable media can be encoded with (e.g., store) computer-executable instructions, data structures, and so forth.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also be made via other networks. Such networking environments are commonplace in homes, offices, enterprisewide computer networks, intranets, and the Internet. The computer 100 can be connected to a network through the network interface 108, such as to a wired or wireless network.

The computer 100 is only one example of a suitable computing environment and is not intended to suggest any limitation as to the scope of use or functionality of the facility. Neither should the computing system environment be interpreted as having any dependency or requirement relating to any one or a combination of the illustrated components.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
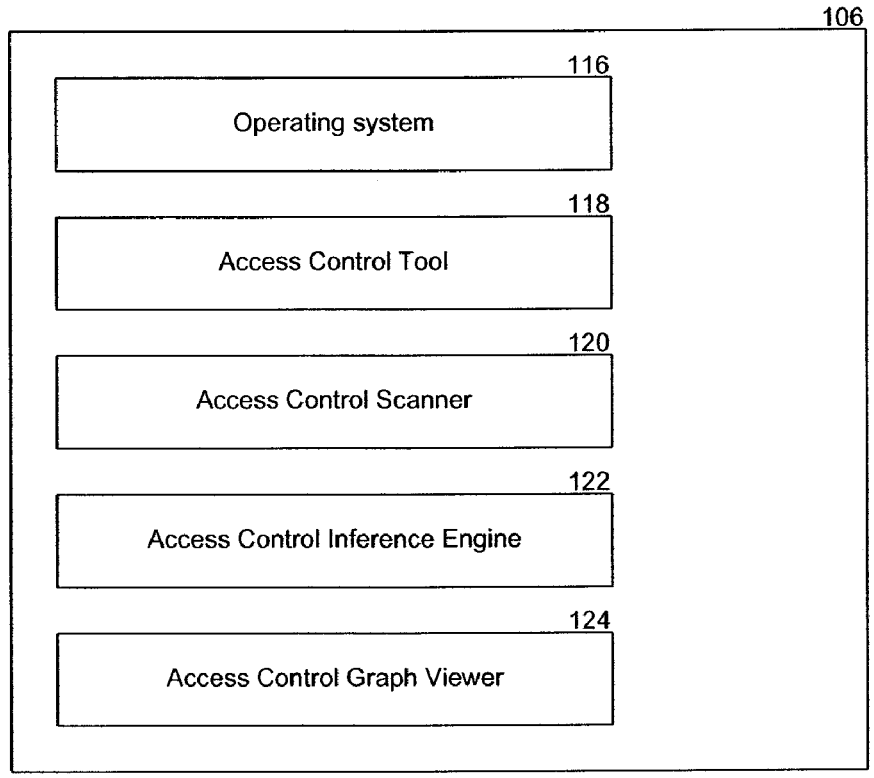
FIG. 1B is a block diagram illustrating a storage unit of FIG. 1A in further detail in some embodiments.

FIG. 1B is a block diagram illustrating a storage unit of FIG. 1A in further detail in some embodiments. According to the illustrated embodiment, the storage unit 106 stores an operating system ("OS") 116, an access control tool 118 ("tool"), access control scanner 120 ("scanner"), access control inference engine 122 ("inference engine"), and access control graph viewer 124 ("graph viewer"). The OS can be any variety of OS, such as MICROSOFT WINDOWS, APPLE MACINTOSH, UNIX, LINUX, and so forth. The tool provides a user interface for a user to command the facility and can employ other components of the facility to complete operations the user commands. The scanner can determine access control relationships between various OS objects (e.g., folders, documents, database tables, network communications ports, and so forth), such as in terms of access control permissions. As an example, the scanner can determine which users or user groups can view or modify files in an identified folder. The inference engine can analyze the control relationships and other information to determine vulnerabilities. The graph viewer can identify the vulnerabilities the inference engine emits, such as in a graphical report. These components are described in further detail below.

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, those skilled in the art will appreciate that the facility may be implemented using devices of various types and configurations, and having various components.

Figure 2:
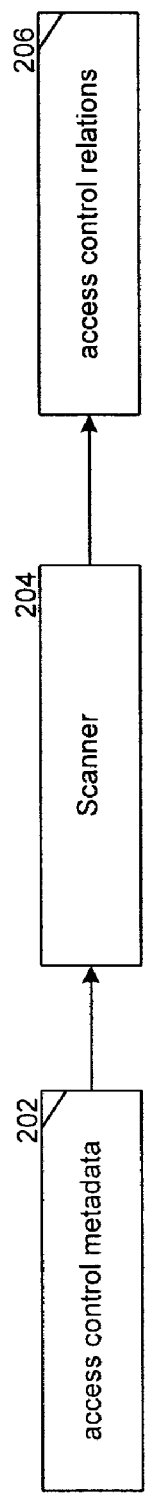
FIG. 2 is a flow diagram illustrating an operation of an access control scanner component in various embodiments.

FIG. 2 is a flow diagram illustrating an operation of an access control scanner component in various embodiments. The facility receives a document 202 containing access control metadata. As an example, the facility may retrieve security descriptor objects associated with files, objects, pipes, memory pages, threads, registry keys, printers, services, file shares, and so forth. Security descriptor objects identify security-related properties, such as access control permissions. As an example, a security descriptor object may identify which users can modify files in a particular folder.

A scanner 204 evaluates the access control metadata to identify a set of access control relations 206. As an example, the scanner determines the set of users, user groups, and so forth that can modify files in a particular folder. The identified access control relations can be stored in a database table, file, or so forth.

Figure 3:
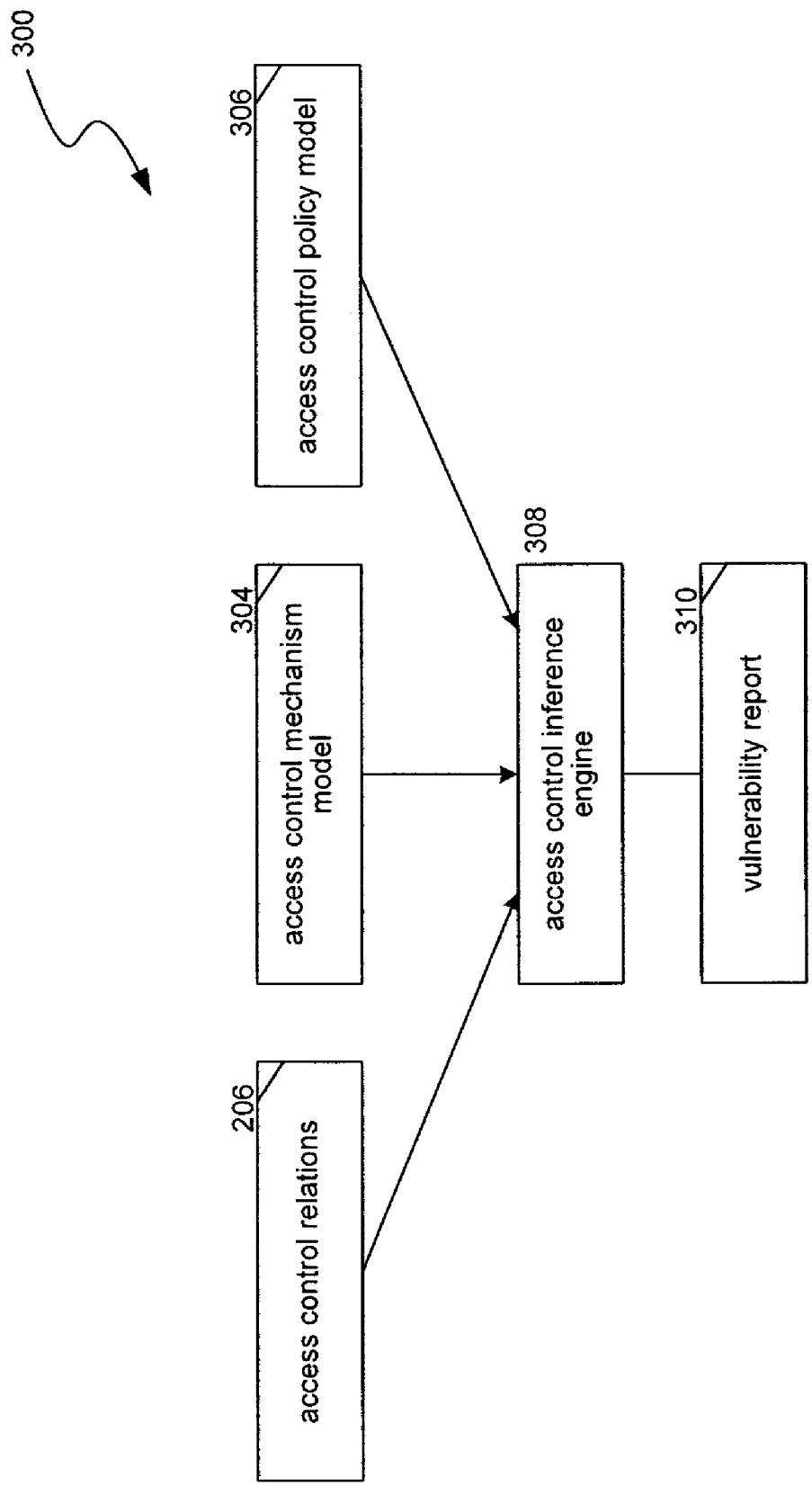
FIG. 3 is a flow diagram illustrating an operation of an access control inference engine component in various embodiments.

FIG. 3 is a flow diagram illustrating an operation of an access control inference engine component in various embodiments. An access control inference engine 308 receives a set of access control relations 206, an access control mechanism model 304, and an access control policy model 306. The access control mechanism model defines how the OS implements access control. This mechanism model can be substituted, such as to enable the inference engine to analyze access control for other OS varieties. As an example, various documents may define access control mechanism models for MICROSOFT WINDOWS, LINUX, and so forth. The access control policy model defines desired security policies. As an example, an access control policy model may indicate that a particular folder is to be accessible only by users in an administrator's group. In various embodiments, a set of access control relations, access control mechanism models, and access control policy models can be defined using various languages or semantics, such as extensible markup language ("XML"), a language similar to Datalog (or Prolog), and so forth.

The access control inference engine generates a vulnerability report 310 that indicates various vulnerabilities. As an example, a vulnerability report may indicate that even though the access control policy model indicates that an identified folder should only be accessible by an administrator, an ordinary user has access to it via the user's access to some other object. The generated vulnerability report can be stored in various forms, such as in XML, Datalog, and so forth.

Figure 4:
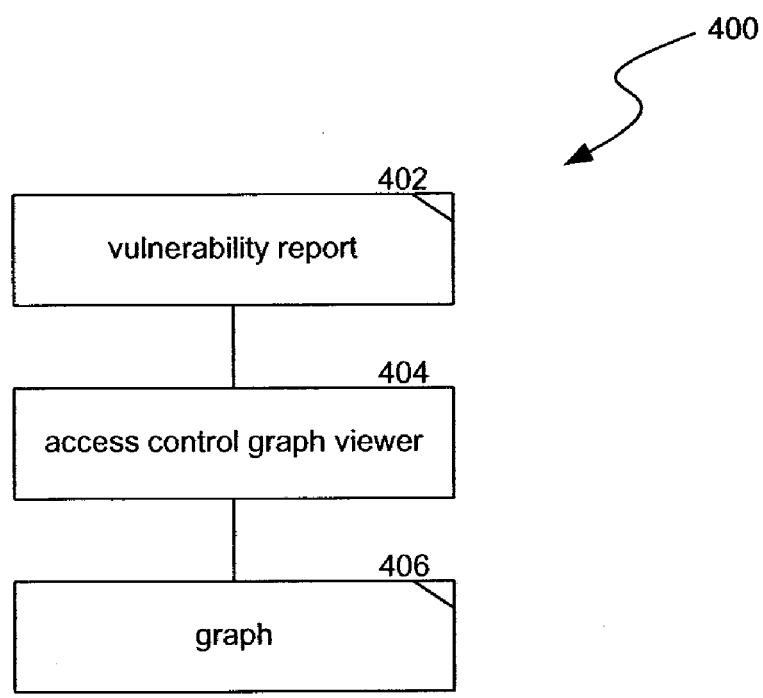
FIG. 4 is a flow diagram illustrating an operation of an access control graph viewer component in various embodiments.

FIG. 4 is a flow diagram illustrating an operation of an access control graph viewer component in various embodiments. An access control graph viewer 404 can receive a vulnerability report 402 as input and generate a graph 406. Examples of graphs are illustrated in FIGS. 5A, 5B, and 6.

FIGS. 5A, 5B, and 6 are samples of vulnerabilities reports illustrated in graphical form. These reports were discussed in detail above.

Figure 7:
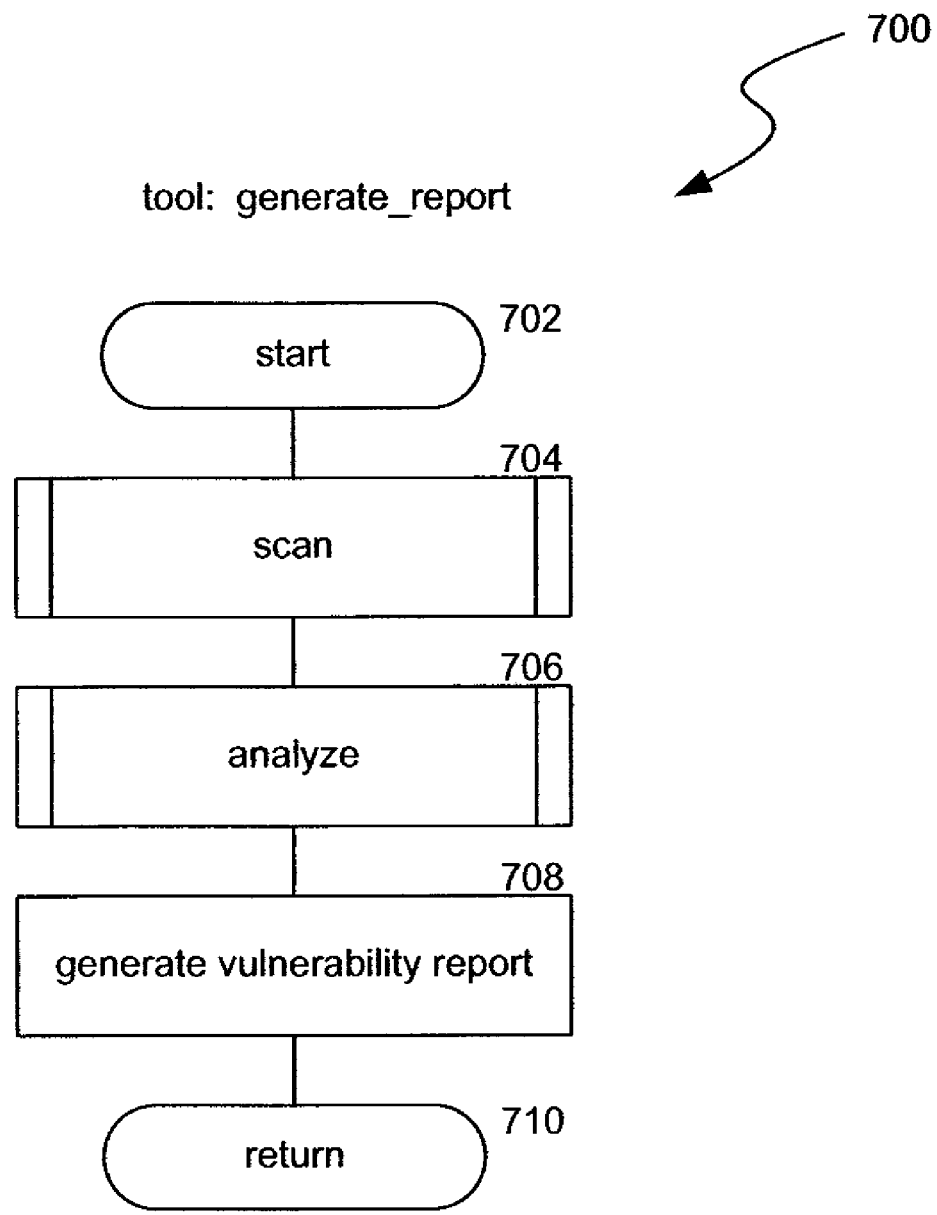
FIG. 7 is a flow diagram illustrating a generate_report routine invoked by the facility in various embodiments.

FIG. 7 is a flow diagram 700 illustrating a generate_report routine invoked by the facility in various embodiments. The tool 118 may invoke the generate_report routine to generate a vulnerability report 310, such as by invoking functionality associated with the scanner and inference engine. The routine starts at block 702.

At block 704, the routine invokes a scan subroutine to identify access control relations. The scan subroutine is described in further detail below in relation to FIG. 8.

At block 706, the routine invokes an analyze subroutine to analyze the access control relations to determine vulnerabilities. The analyze subroutine is described in further detail below in relation to FIG. 9.

At block 708, the routine generates a vulnerability report and at block 710, the routine returns.

Figure 8:
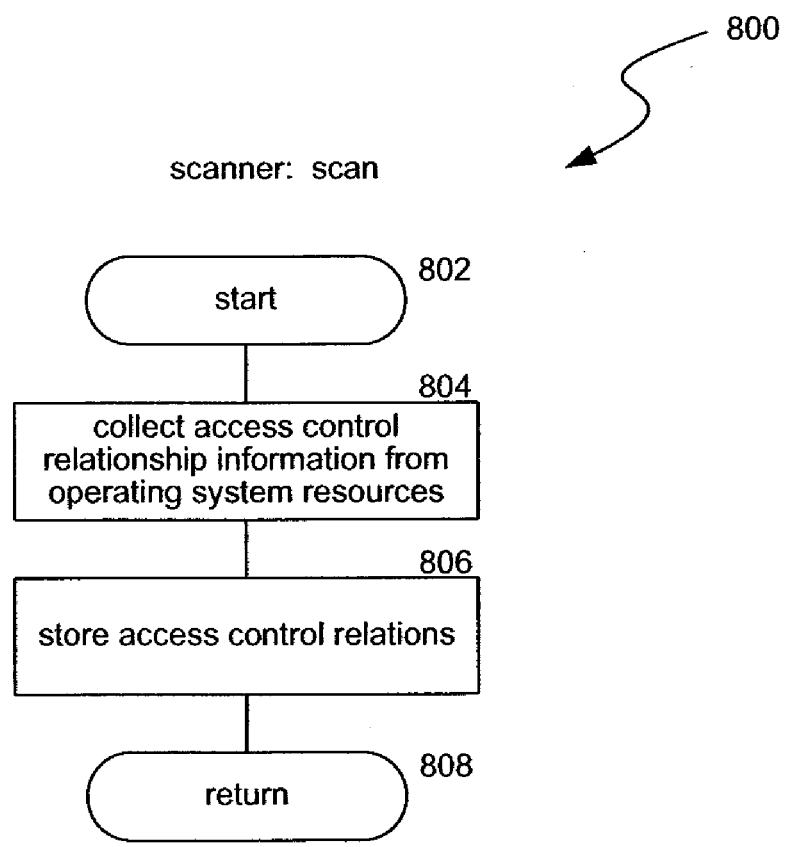
FIG. 8 is a flow diagram illustrating a scan routine invoked by the facility in various embodiments.

FIG. 8 is a flow diagram 800 illustrating a scan routine invoked by the facility in various embodiments. A scanner component can perform the routine, such as when commanded by a tool. The routine starts at block 802.

At block 804, the routine collects access control relationship information from operating system resources. As an example, the routine analyzes properties identified by security descriptor objects.

At block 806, the routine stores the access control relations that it identified, and at block 808, the routine returns.

Figure 9:
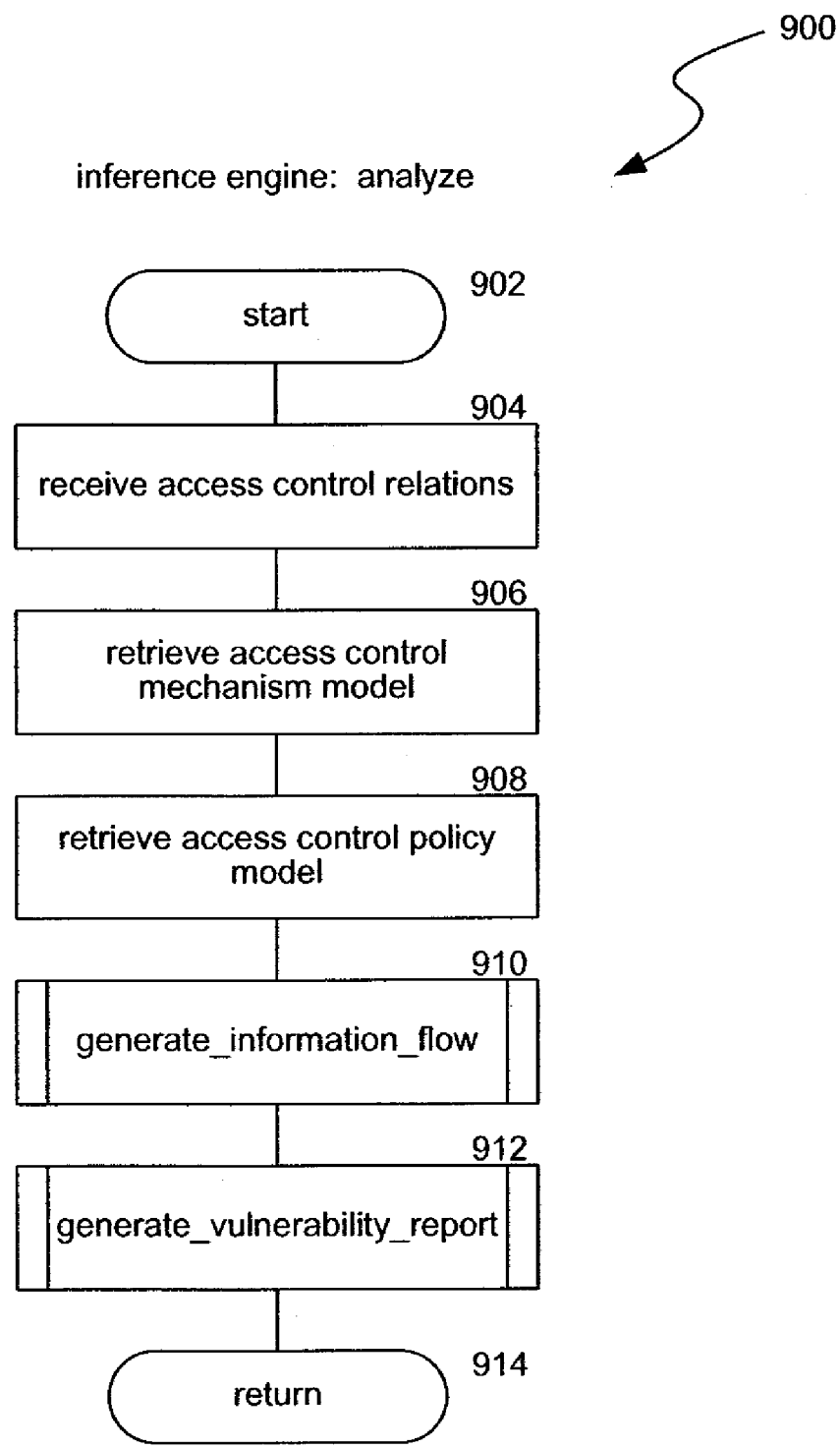
FIG. 9 is a flow diagram illustrating an analyze routine invoked by the facility in various embodiments.

FIG. 9 is a flow diagram illustrating an analyze routine invoked by the facility in various embodiments. An inference engine component can perform the routine, such as when commanded by a tool. The routine starts at block 902.

At block 904, the routine receives access control relations, such as a set of access control relations generated by the scanner.

At block 906, the routine retrieves an access control mechanism model and at block 908, the routine retrieves an access control policy model.

At block 910, the routine invokes a generate_information_flow subroutine to analyze access control permissions. The generate_information_flow subroutine is described in further detail below in relation to FIG. 10.

At block 912, the routine invokes a generate_vulnerability_report subroutine to generate a report. This routine is described in further detail below in relation to FIG. 11.

At block 914, the routine returns.

Figure 10:
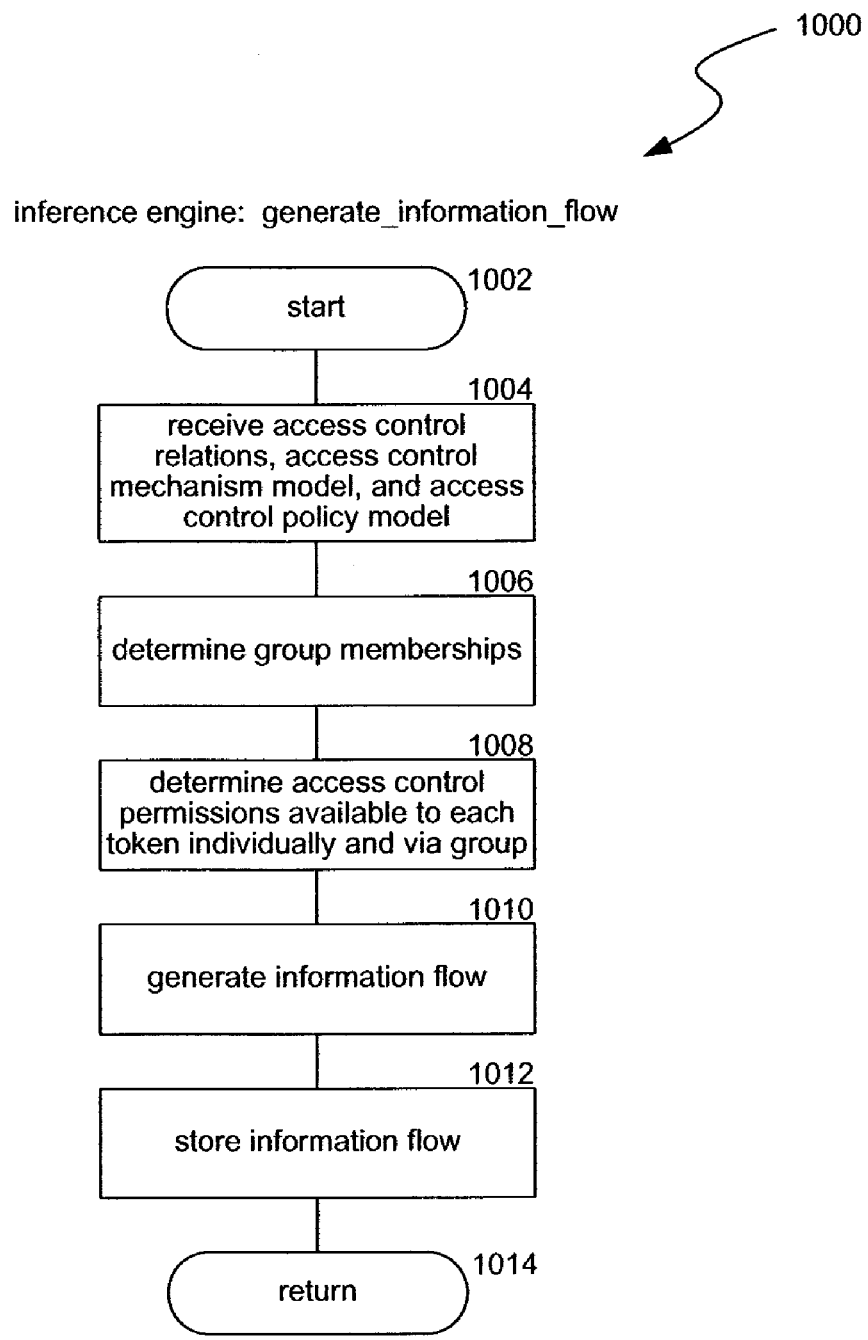
FIG. 10 is a flow diagram illustrating a generate_information_flow routine invoked by the facility in various embodiments.

FIG. 10 is a flow diagram 1000 illustrating a generate_information_flow routine invoked by the facility in various embodiments. An inference engine component can perform the routine, such as when invoked by the analyze routine described immediately above. The routine starts at block 1002.

At block 1004, the routine receives access control relations, an access control mechanism model, and an access control policy model.

At block 1006, the routine determines group memberships. As an example, the routine determines which users belong to each group defined for the OS. Each object to which access control permissions may be provided, such as users, can be identified by a "token."

At block 1008, the routine determines access control permissions available to each token individually and via group membership.

At block 1010, the routine generates an information flow. As an example, the routine evaluates each object and token to determine how the token can interact with the object. The routine generates the information flow by analyzing the access control relations, access control mechanism model, and access control policy model it received at block 1004.

At block 1012, the routine stores the generated information flow and at block 1014, it returns.

Figure 11:
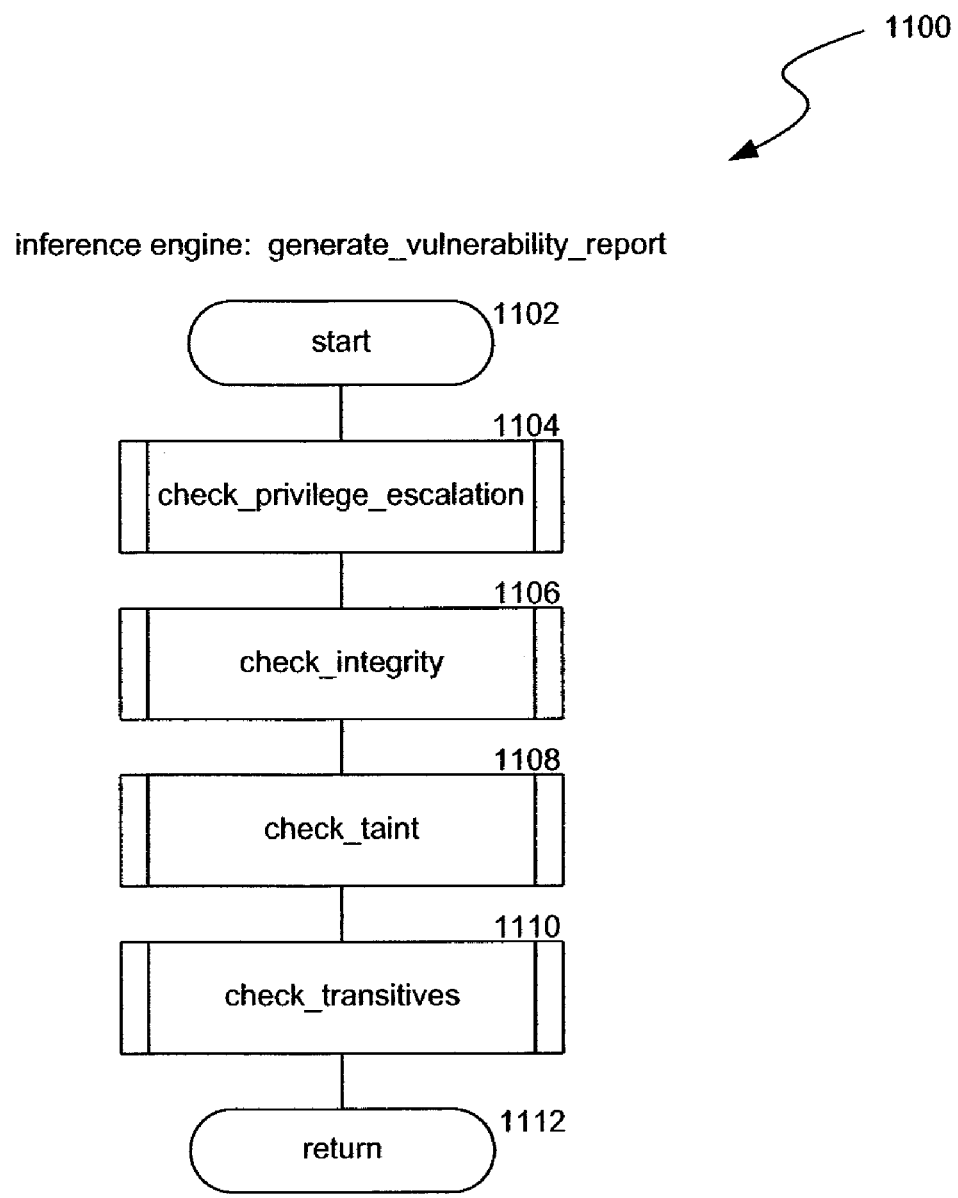
FIG. 11 is a flow diagram illustrating a generate_vulnerability_report routine invoked by the facility in various embodiments.

FIG. 11 is a flow diagram 1100 illustrating a generate_vulnerability_report routine invoked by the facility in various embodiments. An inference engine component can perform the routine, such as when invoked by the analyze routine described above in relation to FIG. 9. The routine starts at block 1102.

At block 1104, the routine determines whether privileges can be escalated, such as by invoking a check_privilege_escalation subroutine. At block 1106, the routine checks integrity. At block 1108, the routine checks for tainting. At block 1110, the routine checks transitives. These checks were described above in relation to vulnerability specifications.

At block 1112, the routine returns.

The techniques can be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Those skilled in the art will appreciate that the logic illustrated in the flow diagrams and described above may be altered in a variety of ways. For example, the order may be rearranged, substeps may be performed in parallel, shown logic may be omitted, or other logic may be included, etc. In various embodiments, the functionality provided by the facility can be adapted in such a way that alternate components provide portions of the described logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for analyzing access control configurations, comprising:
 a processor and memory;
 an operating system having resources and identifications of principals, the principals having access control privileges relating to the resources, the access control privileges described by access control metadata;
 an access control scanner component that receives the access control metadata, uses the metadata to determine relationships between the principals and the resources, and emits access control relations information, wherein the access control scanner component includes a mechanism layer that is configured to be specific to an operating system, and emits one or more sets of permissions in relation to resources, and a policy layer that is configured be general across multiple operating systems, the policy layer receives the one or more sets of permissions and generates one or more derivation trees that each indicate a possible vulnerability based on the relationships between the principals and the resources; and
 an access control inference engine that receives the emitted access control relations information and an access control policy model defining desired security policies, analyzes the received information and model, and emits a vulnerability report.

2. The system of claim 1 wherein the access control relations are identified using a language with semantics that are similar to a Datalog language.

3. The system of claim 1 wherein the access control policy model is identified using a language with semantics that are similar to a Datalog language.

4. The system of claim 1 wherein the vulnerability report is provided in a hierarchical representation.

5. The system of claim 1 wherein the access control inference engine further receives an access control mechanism model.

6. The system of claim 5 wherein the access control mechanism model is identified using a language with semantics that are similar to a Datalog language.

7. The system of claim 1 wherein the vulnerability report identifies a security vulnerability in the operating system.

8. The system of claim 1 wherein the security vulnerability report identifies a reason for the vulnerability.

9. The system of claim 8 wherein the vulnerability relates to a resource and the reason includes an identification of another resource.

10. The system of claim 1 further comprising an access control graph viewer component that receives the vulnerability report and emits a graphical report that illustrates vulnerabilities identified by the vulnerability report.

11. The system of claim 1 wherein the access control scanner component can be substituted with a different access control scanner component for use with a different operating system.

12. The system of claim 11 wherein the access control mechanism model is also substituted with a different access control mechanism model corresponding to the different operating system.

13. A method performed by a computing system for analyzing access control configurations, comprising:
 employing an operating system-specific mechanism layer to retrieve access control metadata, wherein the operating system-specific mechanism layer comprises resources and identifications of principals, the principals having access control privileges relating to the resources;
 employing an access control scanner component that is configured to receive the access control metadata, use the metadata to determine relationships between the principals and the resources, and emit access control relations information, wherein the access control layer includes a layer that is configured to be specific to an operating system, and emit one or more sets of permissions in relation to the resources;
 employing a policy layer that is configured to be general across several operating systems to receive the one or more sets of permissions and to generate one or more derivation trees that each indicates a possible vulnerability based on the relationships between principals and the resources and to determine access control relations based on the retrieved access control metadata;

receiving an access control policy model defining the desired security policies; and analyzing the access control relations and the access control policy model to generate a vulnerability report.

14. The method of claim 13 further comprising generating a graphical view of the generated vulnerability report.

15. The method of claim 13 further comprising retrieving an access control mechanism model.

16. The method of claim 15 wherein the retrieving includes determining a type of operating system and selecting the access control mechanism model based on the type of operating system.

17. The method of claim 15 further comprising generating an information flow wherein the information flow indicates a principal's permissions relating to a resource derived through the principal's permissions relating to another resource.

* * * * *